Dec. 10, 1929.   J. R. BROWN ET AL   1,738,689
FLOAT AND METHOD OF MAKING SAME
Filed Jan. 14, 1928
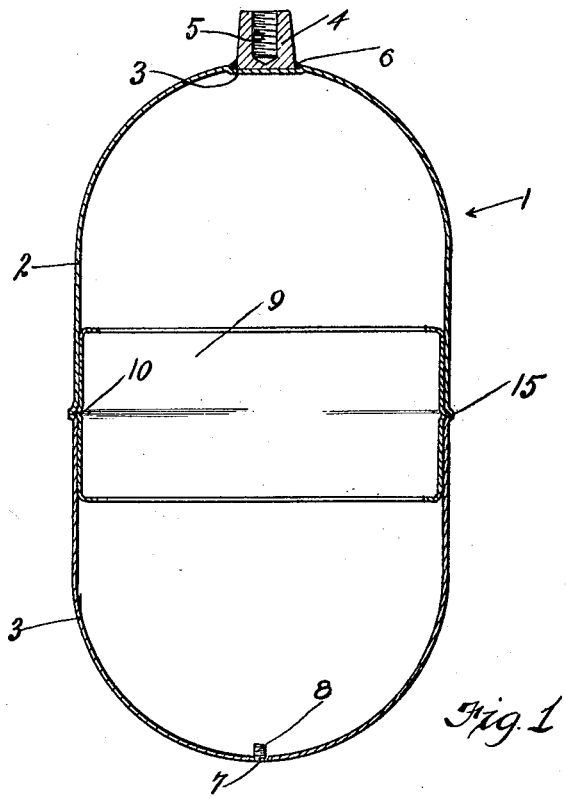
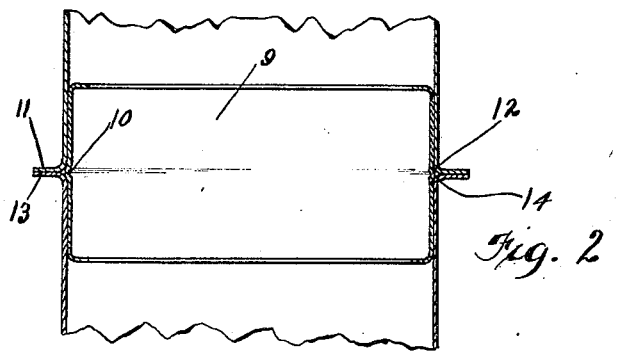
INVENTOR.
John Rowland Brown
BY and John C. Mullinnix
Fay, Oberlin & Fay
ATTORNEYS Patented Dec. 10, 1929

1,738,689

UNITED STATES PATENT OFFICE

JOHN ROWLAND BROWN AND JOHN C. MULLINNIX, OF CLEVELAND, OHIO, ASSIGNORS TO THE RELIANCE GAUGE COLUMN COMPANY, OF CLEVELAND, OHIO, A CORPORATION OF OHIO

FLOAT AND METHOD OF MAKING SAME

Application filed January 14, 1928. Serial No. 246,700.

The present invention relates, as indicated, to a float and method of making the same, and the primary object thereof is to produce a hollow metallic integral float for operating valves and the like. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Fig. 1 is a vertical section of a completed float; and Fig. 2 is an enlarged fragmental section of a float during the process of manufacture.

Referring more particularly to the drawings, the reference numeral 1 indicates generally a float of the type contemplated by the present invention. This float is formed essentially of two mating cup-shaped members 2 and 3. The member 2 is formed with a depression 3' in which is seated a lug 4 having formed therein a threaded recess 5 for the reception of a valve operating stem, or the like. The lug 4 is secured in place in said depression 3 by means of brazing 6 or the like. The cup-shaped member 3 is provided in its closed end with a small aperture 7, which, in the completed float shown in Fig. 1, has been closed by a small threaded plug 8, welded or brazed in position.

In manufacturing the floats contemplated by the present invention, the members 2 and 3 are stamped or spun from sheet metal. A substantially cylindrical member 9 is formed with an annular bead 10 projecting from its external surface about midway of its length. It is to be understood that spaced projections could be substituted for the annular bead 10, but I prefer the continuous bead. The cup-shaped member 2 is provided with an external annular flange 11 extending substantially at right angles from the major surface of the member 2 but bent therefrom through a relatively round curve 12. A similar flange 13 is formed by a similar bend 14 on the member 3. The open end of the cup-shaped member 2 is slipped onto the ring 9 until the bend 12 strikes the bead 10. The cup-shaped member 3 is then slipped onto the opposite end of the member 9 until the curve 14 strikes the bead 10. The curves 12 and 14 and the bead 10 are so formed that, at this time, the flanges 11 and 13 of the cup-shaped members 2 and 3, respectively, are in engagement. These flanges 11 and 13 are then welded together, and the float is completed except for machining down the welded flanges 11 and 13 to form the smooth low bead 15.

It will be readily understood that it is necessary to provide for the release of gases retained in the uncompleted float during the welding process. The cup-shaped members 2 and 3 fit the ring 9 rather closely, and consequently the act of assembling the cup-shaped members of the ring 9 compresses, to some extent, the air in said members. Furthermore, the welding process itself causes a rise in the temperature of the gases in the float, and a consequent expansion thereof.

The rise in the temperature of the air or gas on the inside of the float causes the pressure inside to exceed the atmospheric pressure outside. In the absence of any special provision, this excess pressure would cause small jets of air or gas to blow outward through the weld, making small craters in the plastic or molten material during the welding operation. These craters would later develop into leaks. Even with the small aperture in the end of the member 3 there will normally be a slightly higher pressure inside than outside during the welding process, and in order to prevent this I prefer to connect the aperture 7 to an exhaust pump and very slightly reduce the pressure inside below that outside, for example about one inch vacuum. This has a tendency to permit the external atmospheric pressure to press the molten or plastic metal inward and produces a perfect weld. After the welding is completed, the plug 8 is inserted in the aperture 7 and is tightly sealed, as by brazing or welding.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:

1. A hollow float comprising a pair of mating cup-shaped members having slightly flaring open ends, said members being welded together at said flared ends, an annular brace member fitting into said members and provided with a projecting locating element on its outer surface, said element being seated in a groove formed by the abutment of said flared ends.

2. A hollow float comprising coacting cup-shaped members, having slightly flaring open ends, said flared ends forming a groove therebetween when brought into abutment with each other, said ends being welded together at said flare, and an annular brace member interfitted with said cup-shaped members and lapping said groove, said brace and at least one of said cup-shaped members having complementary engaging portions preventing relative longitudinal movement.

3. A hollow float comprising a pair of mating cup-shaped members having slightly flaring open ends, said flared ends forming a groove therebetween when brought into abutment with each other, said ends being welded together at said flare, and an annular brace member interfitted with said cup-shaped members and lapping said groove, said brace member being formed with a projecting locating element entering said groove.

4. The method of forming hollow floats which comprises bringing coacting cup-shaped members into abutting relation at their open ends together with an annular brace member extending on opposite sides of the abutting ends, said ends being flared outwardly, and welding said ends together independently of said brace member.

5. The method of forming hollow floats which comprises bringing into abutting relation the open, flared ends of coacting cup-shaped members together with an inner annular brace member extending on opposite sides of the abutting ends, and welding said ends together along said flares independently of said brace member.

6. The method of forming hollow floats which comprises bringing into abutting relation over a brace member provided with a projecting locating element, the open flared ends of a pair of mating cup-shaped members, the flares of said members forming an annular groove receiving said locating element, and welding said ends together.

7. The method of forming hollow floats which comprises fitting over one end of a substantially cylindrical brace member, provided with a projecting locating element, the open flared end of a cup-shaped member, and bringing said flared end into engagement with said element, fitting over the other end of said brace member the open flared end of a similar cup-shaped member, and bringing said last-mentioned flared end into engagement with said locating element, said flared ends being shaped to contact each other when so adjusted, and welding said flared ends together.

8. The method of manufacturing hollow floats which comprises bringing into engagement the open ends of a pair of mating cup-shaped members, one of said members being provided with a small aperture in its opposite end, connecting a suction pump to said aperture to reduce the pressure within said members, welding the meeting ends of said members together, and sealing said aperture after completion of said welding.

9. The method of welding together at their open ends two cup-like members which comprises reducing below the external atmospheric value the pressure of the gases contained between said members during the welding operation.

10. In a method of welding together at their open ends a pair of cup-like members to form a single hollow member, the step which consists in connecting a suction pump to the interior of said members and maintaining the pressure therein below the external atmospheric value throughout the welding process.

Signed by us this 10th day of January, 1928.

JOHN ROWLAND BROWN.
JOHN C. MULLINNIX.